United States Patent [19]

Pingaud

[11] 4,376,714
[45] Mar. 15, 1983

[54] PROCESS FOR PREPARING ACICULAR IRON OXIDE PARTICLES

[75] Inventor: Bernard J. Pingaud, Vincennes, France

[73] Assignee: Eastman Kodak Company, Rochester, N.Y.

[21] Appl. No.: 204,722

[22] Filed: Nov. 6, 1980

[30] Foreign Application Priority Data

Jul. 24, 1980 [FR] France ............................... 80 16332

[51] Int. Cl.³ ...................... C01G 49/06; C01G 49/08
[52] U.S. Cl. ............................. 252/62.56; 252/62.57; 252/62.59; 252/62.62; 252/62.63; 423/632; 423/634
[58] Field of Search ............... 252/62.56, 62.57, 62.59, 252/62.62, 62.63; 423/632, 633, 634

[56] References Cited

U.S. PATENT DOCUMENTS 2,636,892 4/1953 Mayer .............................. 423/632 X
3,843,773 10/1974 Pingaud .............................. 423/634
3,928,709 12/1975 Audran et al. ....................... 428/539

FOREIGN PATENT DOCUMENTS 801723 5/1949 Fed. Rep. of Germany .
50-21996 3/1975 Japan ................................... 423/632
1395704 5/1975 United Kingdom .

Primary Examiner—Jack Cooper
Attorney, Agent, or Firm—B. D. Wiese

[57] ABSTRACT

This disclosure relates to a process for preparing acicular magnetic iron oxide particles by (a) adding an aqueous solution of a ferrous salt to an aqueous solution of a stoichiometric excess of alkaline hydroxide while substantially avoiding local excesses of the ferrous salt, to form an aqueous dispersion of ferrous hydroxide particles, (b) oxidizing these particles to form non-magnetic alpha ferric oxide hydrate particles, and (c) converting the non-magnetic particles to magnetic iron oxide particles by dehydration and reduction or dehydration, reduction and oxidation. The ferrous salt solution is subjected to reducing conditions prior to and/or during the addition to the alkaline hydroxide solution to reduce contaminating ferric ions that are normally present to ferrous ions.

23 Claims, 12 Drawing Figures

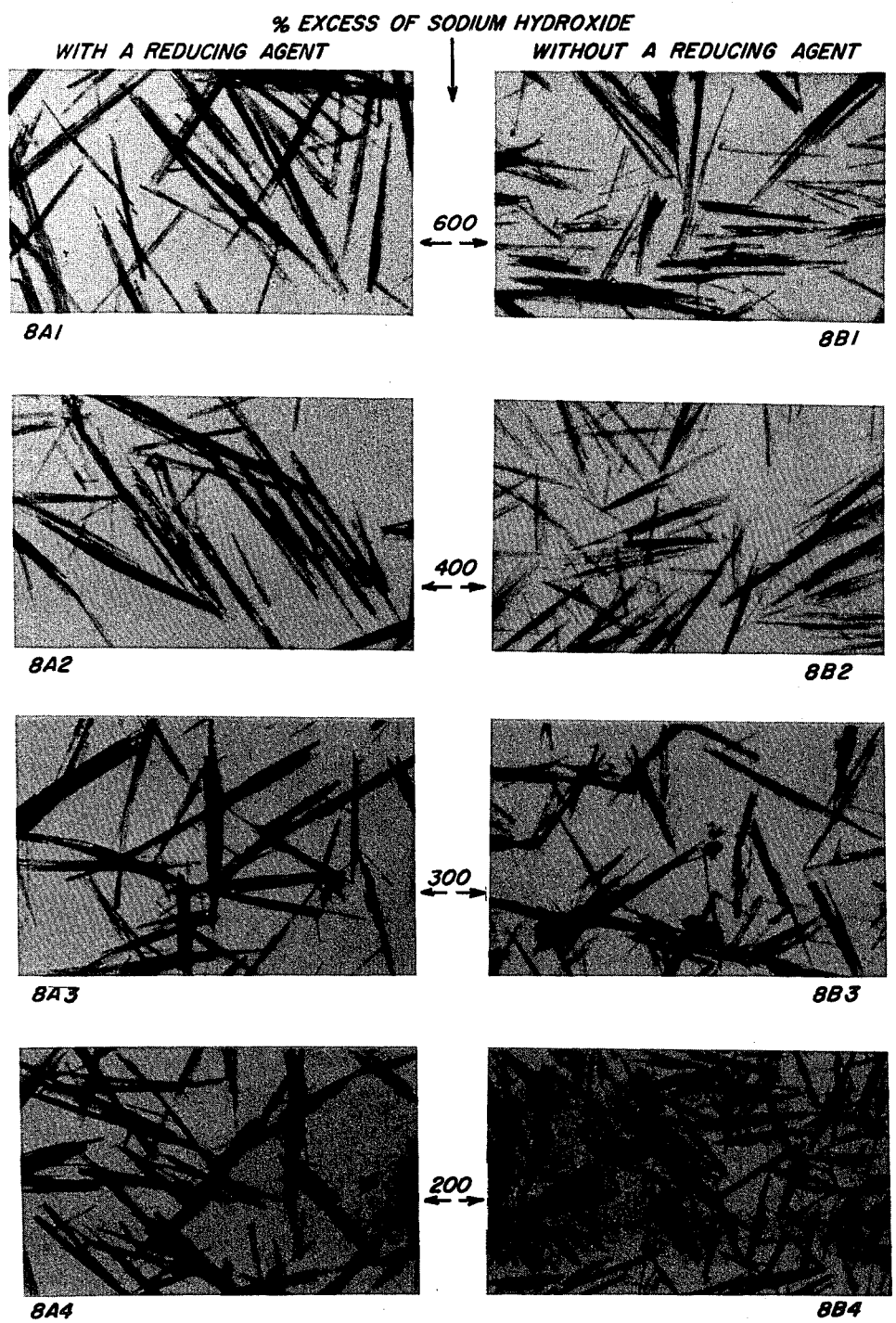

% EXCESS OF SODIUM HYDROXIDE
WITH A REDUCING AGENT  WITHOUT A REDUCING AGENT
 
100
8A5  8B5
 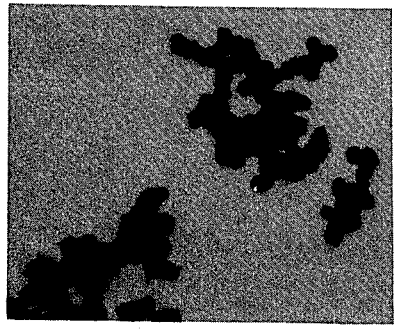
50
8A6  8B6

PROCESS FOR PREPARING ACICULAR IRON OXIDE PARTICLES

BACKGROUND OF THE INVENTION

This invention relates to a process for preparing iron oxide particles. In one aspect, this invention relates to a process for preparing acicular iron oxide particles that exhibit a combination of chemical and electrical properties that make such particles particularly suitable for use in magnetic recording. In another aspect, this invention relates to an improved process for preparing acicular magnetic iron oxide particles which process permits the use of Commercial Grade ferrous salts in the synthesis without the formation of unwanted by-products that are generally associated with the use of such salts, and which deleteriously affect the magnetic recording and reproducing properties of such particles.

DESCRIPTION OF THE PRIOR ART

Acicular magnetic iron oxide particles such as acicular ferrous ferric oxide and acicular gamma ferric oxide particles are known to be useful in magnetic recording. It is also known that the magnetic recording characteristics of such acicular magnetic iron oxide particles are closely related to the chemical and electrical properties of the particles, and that such properties are greatly affected by the process used to prepare them.

As shown in Pingaud U.S. Pat. No. 3,843,773, issued Oct. 22, 1974, United Kingdom Pat. No. 1,395,704, complete specification published May 29, 1975 and Audran et al U.S. Pat. No. 3,928,709, issued Dec. 23, 1975, acicular magnetic iron oxide particles can be obtained by a process involving converting acicular non-magnetic alpha ferric oxide hydrate particles ($\alpha$FeOOH) to acicular magnetic ion oxide particles such as acicular ferrous ferric oxide ($Fe_3O_4$) by dehydration and reduction or to acicular gamma ferric oxide ($\gamma Fe_2O_3$) by dehydration, reduction and oxidation. The aforementioned patents describe forming such non-magnetic alpha ferric oxide hydrate particles by a process comprising adding an aqueous solution of a ferrous salt such as a sulfide or chloride to an aqueous solution of a stoichiometric excess of an alkaline hydroxide such as sodium or potassium hydroxide, while substantially avoiding local excesses of the ferrous salt, to obtain an aqueous dispersion of ferrous hydroxide particles. This dispersion is then oxidized to form non-magnetic alpha ferric oxide hydrate particles.

In processes of the type described, great care is taken during the precipitation of the ferrous hydroxide particles to avoid the preparation of unwanted by-products such as ferric hydroxides and a wide variety of ferrous compounds, because such by-products adversely affect the chemical and electrical properties of the magnetic iron oxides formed later in the process. Furthermore, when such by-products are formed in the precipitation step, very long periods of oxidation are necessary to convert such particles to alpha ferric oxide hydrate particles and, often, magnetite (another unwanted by-product) is formed. Also, long periods of oxidation degrade chemical and electrical properties of the desired magnetic iron oxide particles.

Pingaud U.S. Pat. No. 3,843,733 (Column 3, lines 38–41, for example), teaches that the ferrous hydroxide particles are oxidized slowly, at least over a period of 24 hours, and preferably, over several days, e.g., three to five days, in order to insure the formation of uniform alpha ferric oxide hydrate particles. In addition, the patent (Column 3, lines 13–21, for example) teaches that the concentration of the alpha ferric oxide particles formed in the suspension should not exceed 15 grams per liter. It would be desirable to have a process of the type described in Pingaud U.S. Pat. No. 3,843,773 which process would substantially eliminate unwanted by-products during the precipitation of ferrous hydroxide particles, permit a reduction in the period of time necessary to complete the oxidation of ferrous hydroxide particles, and also permit the concentration of ferric oxide hydrate particles formed in the suspension to be increased substantially in excess of 15 grams per liter. Such a process would, of course, have obvious economic advantages, since it would make it possible to increase the quantity of magnetic iron oxide particles that could be obtained in available equipment in a given period of time.

United Kingdom Pat. No. 1,395,704 (page 2, lines 11–13, for example) and Audran et al U.S. Pat. No. 3,928,709 (Column 4, lines 65–68, for example) also teach that the concentration of the alpha ferric oxide particles formed in the suspension should not exceed 15 grams per liter. Each of these patents also requires the use of a stoichiometric excess of alkaline hydroxide of at least 500 percent for the precipitation of ferrous hydroxide particles in order to minimize the formation of unwanted by-products such as magnetite. The use of this high stoichiometric excess also permits the oxidation of the ferrous hydroxide particles to alpha ferric oxide hydrate particles to proceed to completion in a short time, i.e., in less than three hours. See, for example, United Kingdom Pat. No. 1,395,704, Example 1 and Audran et al U.S. Pat. No. 3,928,709, Column 6, lines 10–11 and Examples 1 and 2. However, it would be desirable to reduce the amount of the stoichiometric excess of alkaline hydroxide employed in processes of the type described in United Kingdom Pat. No. 1,395,704 and Audran et al U.S. Pat. No. 3,928,709, while retaining their relatively short oxidation periods for converting the ferrous hydroxide particles to alpha ferric oxide hydrate particles. It is evident that such a reduction in the stoichiometric excess of alkaline hydroxide would provide savings in costs of materials and in costs incurred in handling relatively high volumes of materials such as aqueous solutions of sodium hydroxide that are potentially hazardous to the environment.

Unfortunately, prior art processes of the type described have not successfully eliminated the formation of unwanted by-products during the precipitation of ferrous hydroxide particles and subsequent oxidation to alpha ferric oxide particles and the undesirable effects of such by-products, because they are formed from ferric ions that are normally present in ferrous salts that are used in the synthesis. Such salts are normally designated "Commercial Grade" (CG) or "Chemically Pure" (CP). This situation is further complicated by the fact that attempts to purify ferrous salts such as ferrous sulfate by conventional methods such as recrystallization to remove acid residues, provides a product that is even more susceptible to oxidation and the formation of ferric ions therein. Also, ferrous salts such as ferrous sulfate readily oxidize in storage and this provides still another source of such ferric ions.

SUMMARY OF THE INVENTION

This invention provides a process for preparing acicular magnetic iron oxide particles which process uses ferrous salts that are normally contaminated with ferric ions, but is not subject to the disadvantages generally associated with the use of such salts in comparable prior art processes. As previously indicated, Commercial Grade and Chemically Pure ferrous salts typically contain ferric ion contaminants. In practicing this process, reducing conditions are employed at a critical stage in the process to substantially eliminate certain unwanted by-products that normally result from using such ferrous salts and detrimentally affect the magnetic recording and reproducing properties of acicular magnetic oxides. Also, in comparison to comparable prior art processes that do not employ reducing conditions as described herein, the process of this invention achieves improved productivity (by increasing the yield of magnetic iron oxide per unit volume of reaction mixture), and eliminates the expense and need for handling very high volumes of materials such as aqueous solutions of sodium hydroxide that are potentially hazardous to the environment.

In practicing this invention, acicular magnetic iron oxide particles are prepared by (a) adding an aqueous solution of a ferrous salt to an aqueous solution of a stoichiometric excess of alkaline hydroxide while substantially avoiding local excesses of the ferrous salt, to form an aqueous dispersion of ferrous hydroxide particles, (b) oxidizing these particles to form non-magnetic alpha ferric oxide hydrate particles, and (c) converting the non-magnetic particles to magnetic iron oxide particles by dehydration and reduction or dehydration, reduction and oxidation. The process of this invention is distinguished by the fact that the ferrous salt solution is subjected to reducing conditions prior to or during addition to the alkaline hydroxide solution to reduce contaminating ferric ions present in such solution to ferrous ions. Of course, this includes reducing some ferric ions prior to said addition and others during said addition.

BRIEF DESCRIPTION OF THE DRAWINGS

The figures include electron micrographs (magnification 22,000 X) of representative samples of alpha ferric oxide hydrate particles prepared using reducing conditions and varying stoichiometric excesses of alkaline hydroxide according to the practice of this invention, as specifically described in Example 8, Run A, which follows. For comparison purposes, the figures also include electron micrographs (magnification 22,000 X) of representative samples of alpha ferric oxide hydrate particles prepared without using reducing conditions and at the same stoichiometric excesses of alkaline hydroxide; as specifically described in Example 8, Run B, which follows.

DESCRIPTION OF PREFERRED EMBODIMENTS

In practicing this invention, the reducing conditions employed are sufficient to achieve reduction of ferric ion contaminants in the ferrous salt prior to and/or during addition of the aqueous ferrous salt solution to the aqueous alkaline hydroxide solution. Such reducing conditions can be provided in many ways, as is obvious to those skilled in the art. For example, the aqueous ferrous salt solution can be added to the aqueous alkaline hydroxide solution in the presence of a sufficient concentration of reducing agent to reduce ferric ion contaminants present in such salt to ferrous ions. Such ferric ion contaminants can be reduced to ferrous ions by other means such as subjecting the ferrous salt solution to electrolytic reduction. However, I prefer to use a reducing agent in the ferrous salt solution and/or in the alkaline hydroxide solution to provide the necessary reducing conditions, as described. Reducing agents suitable for this purpose include those iron III reductants that generally are soluble in the reaction medium, active under the conditions of the process, e.g., pH, and do not deleteriously affect the particle shape or crystalline structure of the ferrous hydroxide and alpha ferric oxide hydrate particles formed during the process. In general, such reducing agents possess a reduction potential that is more negative than $+1$ volt determined on a suitable electrode, e.g., a carbon paste electrode, with respect to a normal hydrogen electrode. Typical reducing agents are organic or inorganic reducing agents, including sulfites such as sodium sulfite and potassium sulfite, hydrosulfites such as sodium hydrosulfite, potassium hydrosulfite, calcium hydrosulfite, dihydroxybenzenes such as hydroquinone, hydroxylamines such as hydroxylamine hydrochloride, phosphites such as sodium phosphite, hypophosphites such as sodium hypophosphite, manganous hypophosphite, potassium hypophosphite, water-soluble hydrazine derivatives, and like compounds, as well as reducing gases such as hydrogen. Sulfites such as sodium sulfite or hydrosulfites such as sodium hydrosulfite ($Na_2S_2O_4 \cdot 2H_2O$) are preferred because upon oxidation, they form sulfates which are normally present in the precipitation medium in large amounts. Such hydrosulfites contain an $S_2O_4=$ radical and are sometimes called "dithionites."

The reducing agent can be added to the reaction medium in any convenient manner, and is generally present, at least in part, when the ferrous salt solution is added to the alkaline hydroxide solution. For example, a suitable reducing agent can be introduced into the reaction medium while the aqueous solution of ferrous salt is added to the aqueous solution of alkaline hydroxide. However, it is usually more convenient to incorporate the reducing agent or a mixture of reducing agents into either or both of the ferrous salt solution, and the alkaline hydroxide solution. The same or different reducing agent can be used in each of these solutions, but generally the same reducing agent is used in each of these solutions. Where the reducing agent is incorporated into the alkaline hydroxide solution, it is often desirable to employ a reducing agent that is capable of reducing oxygen that may be dissolved in such solution, and is also capable of preventing the oxidation of ferrous ions to ferric ions in the alkaline environment of the process. Illustrative reducing agents of this type include sodium hydrosulfite, hydroquinone, and hydroxylamine hydrochloride. Typical embodiments of the invention include the use of sodium hydrosulfite in both the ferrous salt solution and the alkaline hydroxide solution; sodium sulfite in the ferrous salt solution and sodium hydrosulfite in the alkaline hydroxide solution; and sodium sulfite or sodium hydrosulfite in the ferrous salt solution and hydroquinone in the alkaline hydroxide solution. When a reducing agent is used in only one of the reacting solutions, e.g., sodium hydrosulfite in the ferrous salt solution, it is often desirable to flush the alkaline hydroxide solution with an inert gas such as nitrogen, prior to the addition of the ferrous salt solution. Such treatment, which can last for a few minutes or a few hours, may be advantageous, since it can minimize the amount of dissolved oxygen present in the alkaline hydroxide solution prior to reacting it with the aqueous solution of ferrous salt.

The concentration of reducing agent employed in the practice of this invention is subject to wide variation and depends, of course, upon several factors, including its activity and the concentration of ferric ion contaminant present in the ferrous salt. It is possible for one skilled in the art to readily determine the optimum concentration of reducing agent for a desired result with a minimum of routine experimentation. Where a reducing agent is introduced into the ferrous salt solution, a concentration in the range of about 10 to 100 milliequivalents (meq.) often about 10 to 20 meq. per mole of ferrous salt in the solution, gives acceptable results. Typical concentrations when reducing agents are used in alkaline hydroxide solutions are about 2 to 12 meq., often about 4 to 8 meq. per liter of such solution.

The concentrations of ferric ion contaminant present in the ferrous salts normally used in practicing processes of the type described herein are generally very low. However, even at these low concentrations, such ferric ions exhibit a significant and detrimental effect upon the chemical and electrical properties of magnetic iron oxide particles prepared using ferrous salts containing them. It was unexpected that such effects were not prevented in prior art processes by subsequent conversion steps such as oxidation and heat treatments. Furthermore, it would not have been expected that the use of reducing conditions prior to or during the very early step of ferrous hydroxide precipitation, as described herein, would avoid the far-reaching detrimental effects described. Moreover, in the process of this invention, the ferrous hydroxide particles are converted to ferric oxide hydrate particles without passing through the "green rust" and other similar phases typical of comparable prior art processes. In the process of this invention, using stoichiometric excesses of alkaline hydroxide even as low as 50 percent, the ferrous hydroxide particles are grey in color and they are converted to ferric oxide hydrate particles without any appearance of "green rust" or other similar intermediates.

As previously stated, the concentration of ferric ion contaminants in the ferrous salts employed in the practice of this invention are very low. They generally do not exceed about 2 percent, by weight, and are typically in the range of about 0.2 to 0.5 percent, by weight, based on ferrous salt. Such salts are available commercially in both Commercial Grade and Chemically Pure grade from several manufacturers, including Usinor, 60160 Montataire, France, J. T. Baker Chemical Co., Phillipsburg, N.J., Merck Chemical Division of Merck and Co., Rahway, N.J., Mallinckrodt Chemical Works, St. Louis, Mo., S. B. Penick Unit of CPC International, New York, N.Y., and United Mineral and Chemical Corp., New York, N.Y.

In practicing this invention, the ferric oxide hydrate particles are prepared by first adding an aqueous solution of a ferrous salt of the type described herein, to an aqueous solution of an aqueous alkaline hydroxide, generally under non-oxidizing conditions. An aqueous alkaline hydroxide solution is a solution of a compound which will react with the ferrous salt to precipitate ferrous hydroxide, for example an alkaline hydroxide of one of the alkali metals such as sodium or potassium. The non-oxidizing conditions that are generally employed are such that essentially no ferric hydroxide contaminant is introduced into the precipitated ferrous hydroxide dispersion and subsequent oxidation of ferrous to ferric does not begin until desired. Oxygen should be excluded from contact with the reacting solutions to such an extent that at the end of the precipitation of the ferrous hydroxide, the ferric ion content in the dispersion is less than 1 percent, by weight, of the ferrous ion content, and preferably substantially zero, as ascertained by potentiometric measurements and analysis.

In practicing this invention, it is important to add the aqueous ferrous salt solution to the alkaline hydroxide solution, rather than to add these solutions in the reverse order. When the aqueous alkaline hydroxide solution is added to the aqueous ferrous salt solution, the precipitation of the ferrous hydroxide particles begins under acid conditions and is completed in a basic medium. Such process requires that subsequent oxidation be spread over very long periods, e.g., one hundred hours or so, in order that unwanted complexes that are formed can be oxidized to $\alpha$-ferric oxide hydrate particles. As pointed out previously herein, such long oxidation periods are very detrimental to the chemical and electrical properties of magnetic iron oxide particles formed from such $\alpha$-ferric oxide hydrate particles.

Introduction of the ferrous salt solution can conveniently be accomplished by a device which makes it possible to violently disperse and intermix the ferrous salt rapidly while the liquid-air interface is maintained sufficiently calm that an undesirable amount of air is not introduced into the solution from the ambient atmosphere, which avoids any localized imbalance of reagent concentrations and which can also be used for the subsequent introduction of oxygen, for example, as oxygen gas or as air into the dispersion. There are many ways of conducting such a controlled reaction, but a particularly suitable way involves using the device described in Audran U.S. Pat. No. 2,996,286 issued Aug. 15, 1961 (corresponding French Pat. No. 1,157,166). This device, which can be called a "rotary saucer," comprises two coaxial cones, opposed at their bases and very close to each other, carried on a hollow shaft, with openings which enable communication between the interior of the shaft and the immersing liquid volume between the two opposed cones, and thence through the open area on the pheriphery located between the two cones. The shaft is connected to a motor device which imparts to the shaft and to the cones a rotary movement (a rotational speed of about 2800 rpm for cones of about 8-inch diameter is suggested as a starting point from which an optimum value can be ascertained). This assures a centrifugal effect on the fluids that are in contact with the walls of the cones. Suitable valves permit adding liquids or introducing air and other gases through the hollow shaft. First the solution of ferrous salt is admitted to the hollow shaft, and thereupon the liquid particles escaping from this shaft and from between the cones in this area can be rapidly and widely dispersed in the liquid mass wherein the cones turn.

After rapid dispersion of the solution of ferrous salt into the alkaline solution, the precipitated ferrous hydroxide is oxidized so that the nucleation and growth of the crystalline nuclei proceed with great uniformity. In order to assure a constant speed to this reaction, air is admitted to the hollow shaft, whence it is sucked into and dispersed in the suspension by means of the rotation of the shaft and more especially of the attached saucer. The air must be admitted in progressively increasing volumes because the thickening of the suspension makes the solid-gas exchange and the diffusion of the oxygen progressively less efficient. When oxidation is completed, the dispersion or suspension is brought to boiling and boiled for a short time, such as one half hour or one hour, in order to complete and perfect the crystallization of the ferric oxide hydrate particles. Then the dispersion is filtered and the ferric oxide hydrate particles are washed and dried. If other techniques for achieving inter-mixing are employed, an oxygen-free atmosphere above the reactants can conveniently be assured by maintaining a blanket of inert gas such as nitrogen or argon over the surface of the reactants so that premature oxidation does not occur.

The conditions for precipitation and oxidation of the ferrous hydroxide depend on various factors, such as the concentration of the ferrous salt solution, the excess of the alkaline solution, the duration of the precipitation and of the oxidation, as well as the reaction temperature. The concentration and quantity of the starting ferrous salt solution is such that the alpha ferric oxide hydrate content of the oxidized dispersion can reach as much as 60 grams per liter in practicing this invention, particularly when stoichiometric excesses of alkaline hydroxide that do not exceed about 250 percent are used, but typically such content will not exceed about 45 grams per liter, and may be about 10 or 20 to 40 grams per liter.

The excess of the alkaline hydroxide in solution that is used with respect to the necessary stoichiometric quantity to precipitate all of the ferrous salt as ferrous hydroxide is subject to wide variation with typical excesses being about 25 to 600 percent or more, but it is desirably less than about 250 percent, often 50 to 100 percent at the end of the reaction. The concentration of the dissolved alkaline compound does not necessarily remain the same during the precipitation of the ferrous hydroxide and during its oxidation since it may be advantageous to dilute the slurry before beginning the oxidation. This fact should be kept in mind when choosing a suitable concentration of alkaline hydroxide to use in the precipitation of ferrous hydroxide.

As previously indicated herein, the use of smaller stoichiometric excesses of alkaline hydroxide, e.g., excesses of less than 250 percent, provides certain economies in operation in comparison to comparable prior art processes that employ larger excesses, e.g., excesses of at least about 500 percent. Furthermore, as shown in Runs A and B of Example 8 which follows, the average length of the alpha ferric oxide hydrate particles generally increases with an increase in the stoichiometric excess of alkaline hydroxide used in the process (other reaction parameters being kept constant). By using low excesses according to the process of this invention, one can attain the aforementioned economies of operation, and also extend the range of particle sizes that can be produced to include acicular magnetic iron oxides of very short lengths, e.g., average lengths of less than 0.3 micron, e.g., about 0.15 to 0.2 micron.

The alkaline hydroxide solution employed to precipitate the ferrous salt as ferrous hydroxide, as described herein, can be a hydroxide of any of the alkali metals from Group IA of the Periodic Table, for example, sodium hydroxide or potassium hydroxide. The ferrous salt used can be any salt or hydrate thereof that is sufficiently soluble to make the starting solution and which will not complex the ferrous hydroxide. Ferrous chloride having 4 molecules of water, or ferrous sulfate having 7 molecules of water are common examples of such salts.

The precipitation of ferrous hydroxide is generally accomplished quite rapidly, advantageously in less than about 10 minutes. Generally the dispersion of ferrous hydroxide is stirred for a period of time, e.g., 30 minutes, after the end of the introduction of ferrous salt and before oxidation begins to insure that all of the ferrous salt is precipitated as a homogenous ferrous hydroxide.

The time required to complete the oxidation of ferrous hydroxide is dependent on several factors, including the rate at which oxygen, generally as air, is introduced into the suspension, the temperature, the alkaline hydroxide excess and the concentration of the ferrous hydroxide in the dispersion. Oxidation can generally be started about 30 minutes after terminating the inflow of the ferrous salt solution so that all of the ferrous hydroxide is precipitated and comes to equilibrium in the suspension. In order to obtain homogeneous crystals of alpha ferric oxide hydrate the growth of the crystalline nuclei must progress smoothly, which requires control of the oxidation rate. The oxidation rate is adjusted as a function of the kinetic growth of the alpha ferric oxide hydrate crystals which requires that the flow rate of the oxidizing agent be adjusted during the course of the oxidation. Generally this flow rate is increased during the oxidation. The duration of the oxidation is subject to variation; it is usually completed in three hours, but longer periods can be used. However, it is generally unnecessary to use oxidation periods in excess of six hours. When oxidation is complete, the dispersion of alpha ferric oxide hydrate is brought to boiling for a short time, e.g., 30 minutes to one hour, in order to complete and perfect the crystallization of the alpha ferric oxide hydrate particles. Then the dispersion is generally cooled, filtered, washed with water and dried.

The length of the acicular alpha ferric oxide hydrate grows when the duration of precipitation and of oxidation increase, other conditions of reaction, particularly the concentration of such crystals in the final dispersion, being the same. It should be noted, however, that the concentration of acicular alpha ferric oxide hydrate in the final dispersion has a significant influence on the length and on the acicularity ratio of the particles.

Depending upon the conditions of preparation, the acicular alpha ferric oxide hydrate particles have an average length of about 0.2 micron or less up to about 1.5 micron. Upon dehydration and reduction or dehydration, reduction and oxidation, the very small alpha ferric oxide hydrate particles (up to about 0.2 micron average length) form magnetic iron oxide particles having average lengths that are about one-half the average length of the precursor alpha ferric oxide hydrate particles. In contrast, larger alpha ferric oxide hydrate particles, e.g., those having average particle lengths of about 0.8 micron, do not undergo such a significant reduction in length upon conversion to magnetic iron oxide particles.

The temperature during precipitation and oxidation is generally kept lower than 60° C. When the temperature increases, the length of the particles is not changed significantly, but the diameter increases and the acicularity ratio decreases correspondingly. At still higher temperatures, cubic ferric oxide particles are formed directly with the length of the cube edge being about the length of the acicular particles that would have formed at lower temperatures.

The above procedure produces particles having sodium ions in the crystal lattice of the particle (or potassium or other alkali metal if potassium hydroxide or other alkali hydroxide is used in the initial solution).

As is obvious to those skilled in the art, other doping metal ions can be introduced into the particles. For example, alkaline earth metal ions such as calcium ions can be introduced in the washing step by washing the particles with water to which such ions have been added, such as calcium chloride or bicarbonate. Doping metal ions of polyvalent metals such as cobalt, nickel, chromium, zinc, cadmium, manganese, tin, samarium, or europium can be introduced by dissolving suitable water soluble compounds (e.g., sulfates or nitrates) in the initial ferrous salt solution in appropriate quantities. Ferrous iron dopant can be introduced by appropriate modification of the oxidation step used in converting the non-magnetic alpha ferric oxide hydrate particles to magnetic iron oxide particles, as described herein. For example, the oxidation can be stopped short of complete conversion to acicular gamma ferric oxide particles to provide a desired concentration of dopant, such as up to 30 atomic percent, often 12–20 atomic percent, within the crystal lattice of such particles. As is known in the art, the acicular magnetic iron oxides can also be doped after formation of the particles. Of course, the acicular magnetic iron oxides can be doped with mixtures of doping metal ions, including those specifically discussed above. The concentration of doping metal ion employed is subject to variation, depending on such things as size of the magnetic particles. However, dopant levels in the range of about 1 to about 7 atomic percent, often about 1 to about 4 atomic percent, are typical.

The alpha ferric oxide hydrate particles obtained as described above, are converted to acicular magnetic iron oxide particles such as acicular ferrous ferric oxide particles by dehydration and reduction or acicular gamma ferric oxide particles by dehydration, reduction and oxidation. In the first phase, the alpha ferric oxide hydrate particles are dehydrated at a temperature of about 100° C. to 350° C., e.g., about 270° C., and reduced at a temperature of about 300° C. to 400° C., e.g., about 350° C. If oxidation is required in order to obtain acicular gamma ferric oxide particles, a suitable oxidation temperature is generally about 300° C. to 400° C., e.g., about 350° C. The acicularity ratios (average length to width ratios) of the magnetic iron oxide particles prepared according to this invention can be quite low, e.g., average acicularity ratios of about 2 to 8 or 10, but higher acicularity ratios of 15 or more, for example, acicularity ratios in the range of about 20 to 40, can be obtained, depending upon the specific conditions employed. The average lengths of these particles also depend upon the specific conditions employed in the process. However, such particles exhibit a very uniform size distribution or homogeniety in particle size, and their average lengths are generally less than 1.5 micron, often 0.5 to 0.8 micron, and can even be as small as 0.05 to 0.2 micron. The coercivity ($H_c$) of the particles is subject to wide variation, but is preferably at least 450 Oe and is often in the range of about 450 to 1,200 or 1,600 Oe.

The acicular magnetic iron oxide particles prepared as described herein, can be employed in magnetic recording layers applied to a wide variety of non-magnetizable supports, including discs, belts, paper or film and the like. Such oxides can be used in audio, video and instrumentation (physical data) recording tapes. Suitable supports can be subbed by known methods, are generally flexible and typically include such materials as cellulose acetate film, polyvinyl acetal film, polystyrene film, polyesters such as poly(ethylene terephthalate) film, polyesters such as poly(ethylene terephthalate) film which can be biaxially or asymmetrically stretched, polycarbonate film and related films or resinous materials as well as papers, metals such as aluminum or brass, and the like. The thickness of the support is subject to variation; however, such supports generally have a thickness in the range of about 4 to about 300 microns, often in the range of about 6 to about 38 microns, and preferably in the range of about 12 to about 25 microns. As far as practical, the support surface coated with the magnetic recording dispersions should be as smooth as possible.

Binders that can be used to disperse the acicular magnetic oxide particles in magnetic recording layers include any of the binders well known for the manufacture of magnetic recording layers. Typical binders are polymeric binding agents such as copolymers of vinyl acetate with vinyl chloride, copolymers of vinylidene chloride with acrylonitrile, copolymers of acrylic and/or methacrylic esters, polyvinylbutyral, copolymers of butadiene with styrene, terpolymers of acrylonitrile, vinylidene chloride and maleic anhydride, crosslinked or noncrosslinked, homopolymers or copolymers such as polyamide, polyurethanes, polyesters and the like as well as mixtures of these binders. Very good results can be obtained with a copolymer of vinyl acetate with vinyl chloride, partially hydrolyzed and possibly crosslinked with an isocyanate or any of the many similar reactive constituents, or by using polyurethanes or polyesters or a mixture of these binders. The amount of binder employed with respect to the iron oxide particles in a magnetic recording element is generally in the range of about 10 percent to about 40 percent, by weight, and preferably from about 15 percent to about 25 percent, by weight.

Suitable solvents that can be employed in the preparation of the magnetic dispersions include organic materials such as methyl ethyl ketone, methyl isobutyl ketone, ethyl acetate, butyl acetate, cyclohexanone, butyl alcohol, methylene chloride, and the like as well as mixtures thereof. The magnetic recording layers can contain other additives such as lubricants, as would be obvious to those skilled in the art.

Magnetic recording elements prepared using dispersions of acicular magnetic iron oxide particles prepared according to this invention, in a suitable binder, exhibit excellent magnetic recording and reproducing characteristics. This can be illustrated by preparing a magnetic tape comprising a layer containing such particles using conventional tape manufacturing procedures and comparing the properties of such tape with a magnetic tape prepared by the same procedures, but using comparable conventional acicular magnetic iron oxide particles that are not prepared under reducing conditions according to the process of this invention. When appropriate measurements are made on these two tapes using conventional equipment, the tape prepared using acicular magnetic iron oxide particles prepared according to the process of this invention shows an improvement in signal to noise ratio of at least 2 to 3 dB over such comparison tape. A suitable measurement procedure is described hereinafter, with respect to the following Examples.

This invention is further illustrated by the following Examples of its practice. In each of these Examples, the ferrous salt employed was Commercial Grade (Examples 1–9 and 11) or Chemically Pure grade (Example 10), and contained the normally occurring ferric ion contaminants. No specific treatments were used to add or remove such contaminants. Such ferrous salts contained up to about 0.5 percent, by weight, of ferric ion, based on the weight of the salt. The Commercial Grade ferrous sulfate used in Examples 1–9 was obtained from Usinor, 60160 Montataire, France, under the designation Sulfate Ferreux Niege, Norme NFU 43010, while the Chemically Pure Grade ferrous sulfate used in Example 10 was obtained from Merck Chemical Division of Merck and Co., Rahway, N.J. as reagent grade No. 3965.

The signal level (output) for magnetic recording elements prepared using dispersions of acicular magnetic iron oxide particles prepared according to certain of the following Examples were measured using conventional procedures and the following specific test conditions:

MEASUREMENTS PROCEDURE

1. Measurement Conditions

| Tape recorder | | Honeywell 7600 |
|---|---|---|
| Linear speed of the tape | in/sec | 7½ (19.05 cm/sec) |
| Recording gap | micron | 0.3 |
| Playback gap | micron | 0.3 |
| Track width | in | 0.010 (0.25 mm.) |

2. Signal Level (Output)

The bias is increased while monitoring the output at 300 kHz until the maximum output is observed. Then the bias is further increased until the output at 300 kHz is reduced to 2 dB below the maximum.

The recording current at the operating bias is increased until the output of a 30 kHz sine wave recording contains 1% of the third harmonic (90 kHz).

The output levels are expressed in dB with respect to 1 mV at the terminals of the playback head.

EXAMPLE 1

10 liters of demineralized water, 1512 grams (600 percent excess) sodium hydroxide and 6 grams of sodium hydrosulfite ($Na_2S_2O_4.2H_2O$) reducing agent were placed in a 20 liter vessel. After complete dissolution of the components in the solution, the temperature was lowered and stabilized at 25° C. Using the motor driven hollow shaft and dispersing device of Audran U.S. Pat. No. 2,996,287, issued Aug. 15, 1961, (corresponding French Pat. No. 1,157,156) and described hereinbefore, a solution containing 2 liters of demineralized water, 750 grams of ferrous sulfate ($FeSO_4.7H_2O$), 34.3 grams of cobaltous sulfate ($CoSO_4.7H_2O$) and 10 grams of sodium hydrosulfite ($Na_2S_2O_4.2H_2O$) was flowed into the sodium hydroxide solution in 5 minutes. The solution in the reaction vessel was maintained at 25° C. throughout the reaction.

30 minutes after the end of the precipitation, air was blown progressively into the suspension of ferrous hydroxide maintained at 25° C., at a flow rate of 30 liters/hour using the aforementioned dispersing device.

After 3 hours of oxidation, the temperature was raised to the boiling point of the dispersion for 30 minutes. The dispersion contained about 20 grams/liter of cobalt doped alpha ferric oxide hydrate. The dispersion was filtered, washed with demineralized water, and the resulting non-magnetic, cobalt doped alpha ferric oxide hydrate particles were dried.

The non-magnetic particles were converted to magnetic, cobalt doped gamma ferric oxide particles by conventional heat treatment. Thus, the alpha ferric oxide hydrate particles were dehydrated at 270° C. to alpha ferric oxide particles, reduced at 325° C. to ferrous ferric oxide particles and oxidized at 325° C. to gamma ferric oxide particles. The resulting cobalt doped gamma ferric oxide particles had an average length of 0.6 to 0.8 micron and an average acicularity ratio of 10 to 15.

EXAMPLE 2

The process of this invention can be practiced without using the high stoichiometric excesses (at least 500 percent) of alkaline hydroxide previously thought to be desirable in prior art processes of this type, as illustrated by United Kingdom Pat. No. 1,395,704, complete specification published May 29, 1975. This Example, and certain later Examples, illustrate this feature of the invention.

10 liters of demineralized water, 640 grams (90 percent excess) sodium hydroxide and 4 grams of sodium hydrosulfite ($Na_2S_2O_4.2H_2O$) reducing agent were placed in a 20 liter vessel. After complete dissolution of the components in the solution, the temperature was lowered and stabilized at 25° C. Using the motor driven hollow shaft and dispersing device of Audran U.S. Pat. No. 2,996,287, issued Aug. 15, 1961 (corresponding French Pat. No. 1,157,156) and described hereinbefore, a solution containing 2 liters of demineralized water, 1,123 grams of ferrous sulfate ($FeSO_4.7H_2O$), 54 grams of cobaltous sulfate ($CoSO_4.7H_2O$) and 6 grams of sodium hydrosulfite ($Na_2S_2O_4.2H_2O$) was flowed into the sodium hydroxide solution in about 3 minutes. The solution in the reaction vessel was maintained at 25° C. throughout the reaction.

Fifteen minutes after the end of the precipitation, air was blown progressively into the suspension of ferrous hydroxide maintained at 25° C., at a flow rate in the range of from 5 liters/hour to 60 liters/hour using the aforementioned dispersing device.

After 3 hours of oxidation, the temperature was raised to the boiling point of the dispersion for 30 minutes. The dispersion contained about 30 grams/liter of cobalt doped alpha ferric oxide hydrate. The dispersion was filtered, washed with demineralized water and the resulting non-magnetic, cobalt doped alpha ferric oxide hydrate particles were dried.

These non-magnetic particles were converted to magnetic, cobalt doped gamma ferric oxide particles by conventional heat treatment. Thus, the alpha ferric oxide hydrate particles were dehydrated at 270° C. to alpha ferric oxide particles, reduced at 325° C. to ferrous ferric oxide particles and oxidized at 325° C. to gamma ferric oxide particles. The resulting cobalt doped gamma ferric oxide particles had an average length of 0.15 to 0.2 micron and an average acicularity ratio of 6 to 8.

A sample of these cobalt doped gamma ferric oxide particles was dispersed in a binder of poly(vinyl acetate-vinyl chloride), partially hydrolyzed, (Rhodopas AXRH, commercially available from Rhone-Poulenc).

The resulting dispersion was coated on 19 or 23 microns thick polyester base. After coating and evaporation of the solvent, the magnetic recording layer was calendered and had a final thickness of 5 microns.

The signal level (dB) for the layer which had a coercivity ($H_c$) of 920 Oe, determined as described previously herein, was as follows:

| 10 K | 100 K | 300 K | Max. 300 K w/bias | Max. 300 K w/o bias |
|---|---|---|---|---|
| +0.5 | +4.5 | +8.5 | +8.5 | +9.0 |

EXAMPLE 3

The procedure of Example 2 was repeated, using the following solutions:

| Sodium Hydroxide Solution | |
|---|---|
| demineralized water | 10 l. |
| sodium hydroxide | 210 g. (80 percent excess) |
| sodium hydrosulfite | 5 g. |
| Ferrous Salt Solution | |
| demineralized water | 2 l. |
| ferrous sulfate | 380 g. |
| cobaltous sulfate | 17 g. |
| sodium hydrosulfite | 3 g. |

The procedures and conditions of Example 2 were repeated, except that the suspension of ferrous hydroxide was oxidized for only two hours. The cobalt doped gamma ferric oxide particles obtained had an average length of 0.05 to 0.1 micron and an average acicularity ratio of 5 to 7.

A sample of these cobalt doped gamma ferric oxide particles was dispersed and coated to form a magnetic recording layer having a coercivity ($H_c$) of 940 Oe using the procedure of Example 2. The signal level (dB) for the layer was as follows:

| 10 K | 100 K | 300 K | Max. 300 K w/bias | Max. 300 K w/o bias |
|---|---|---|---|---|
| +2.0 | +4.5 | +8.0 | +9.0 | +10 |

EXAMPLE 4

The procedure of Example 2 was repeated, using the following solutions:

| Sodium Hydroxide Solution | |
|---|---|
| demineralized water | 10 l. |
| sodium hydroxide | 400 g. (85 percent excess) |
| sodium hydrosulfite | 4.5 g. |
| Ferrous Salt Solution | |
| demineralized water | 2 l. |
| ferrous sulfate | 750 g. |
| sodium sulfite ($Na_2SO_3$) | 6 g. |

The procedure and conditions of Example 2 were repeated, except that the suspension of ferrous hydroxide was oxidized for 1½ hours, and the concentration of the cobalt doped alpha ferric oxide hydrate in the resulting suspension was 20 grams/liter.

The gamma ferric oxide particles obtained had an average length of 0.1 to 0.15 and an average acicularity ratio of 7 to 8.

EXAMPLE 5

The procedure of Example 2 was repeated with the following solutions:

| Sodium Hydroxide Solution | |
|---|---|
| demineralized water | 10 l. |
| sodium hydroxide | 700 g. (62 percent excess) |
| hydroquinone | 10 g. |
| Ferrous Salt Solution | |
| demineralized water | 2 l. |
| ferrous sulfate | 1500 g. |
| sodium sulfite | 10 g. |

The procedure and conditions of Example 2 were repeated, except that the suspension of ferrous hydroxide was oxidized for four hours and the concentration of the alpha ferric oxide hydrate in the resulting suspension was 40 grams per liter.

The gamma ferric oxide particles obtained had an average length of 0.2 to 0.25 micron and an average acicularity ration of 8 to 10.

EXAMPLE 6

The process of this invention can be run on a large scale to provide magnetic particles that exhibit uniform size, shape and composition in reasonably short periods of time. This example illustrates this particular feature of the invention.

250 liters of demineralized water, 12 kilograms (70 percent excess) sodium hydroxide and 50 grams of sodium hydrosulfite ($Na_2S_2O_4.2H_2O$) reducing agent were placed in a 500 liter vessel. After complete dissolution of the components in the solution, the temperature was lowered and stabilized at 25° C. Using the motor driven hollow shaft and dispersing device of Audran U.S. Pat. No. 2,996,287, issued Aug. 15, 1961 (corresponding French Pat. No. 1,157,156) and described hereinbefore, a solution containing 50 liters of demineralized water, 23.5 kilograms of ferrous sulfate ($FeSO_4.7H_2O$), 200 grams of cobaltous sulfate ($CoSO_4.7H_2O$) and 50 grams of sodium hydrosulfite ($Na_2S_2O_4.2H_2O$) was flowed into the sodium hydroxide solution in 5 minutes. The solution in the reaction vessel was maintained at 25° C. throughout the reaction.

Fifteen minutes after the end of the precipitation, air was blown progressively into the suspension of ferrous hydroxide maintained at 25° C., at a flow rate of 750 liters/hour using the aforementioned dispersing device. After 2½ hours of oxidation, the temperature was raised to the boiling point of the dispersion for 30 minutes. The dispersion contained about 25 grams/liter of cobalt doped alpha ferric oxide hydrate. The dispersion was filtered, washed with demineralized water and the resulting non-magnetic, cobalt doped alpha ferric oxide hydrate particles were dried.

These non-magnetic particles were converted to magnetic, cobalt doped gamma ferric oxide particles by conventional heat treatment. Thus, the alpha ferric oxide hydrate particles were dehydrated at 270° C. to alpha ferric oxide particles, reduced at 350° C. to ferrous ferric oxide particles and oxidized at 350° C. to gamma ferric oxide particles. The resulting cobalt doped gamma ferric oxide particles had an average length of 0.15 to 0.2 micron and an average acicularity ratio of 7 to 8.

A sample of these cobalt doped gamma ferric oxide particles was dispersed and coated to form a magnetic recording layer having a coercivity ($H_c$) of 800 Oe using the procedure of Example 2. The signal level (dB) for the layer was as follows:

| 10 K | 100 K | 300 K | Max. 300 K w/bias | Max. 300 K w/o bias |
|---|---|---|---|---|
| 0 | +2.0 | +6.0 | +8.0 | +8.0 |

EXAMPLE 7

The procedure of Example 2 was repeated with the following solutions:

| Sodium Hydroxide Solution | |
|---|---|
| demineralized water | 10 l. |
| sodium hydroxide | 1,000 g. (190 percent excess) |
| sodium hydrosulfite | 3 g. |
| Ferrous Salt Solution | |
| demineralized water | 2 l. |
| ferrous sulfate | 1,200 g. |
| sodium hydrosulfite | 10 g. |

The procedure and conditions of Example 2 were repeated except that the suspension of ferrous hydroxide was oxidized for 3½ hours, and the concentration of the alpha ferric oxide hydrate in the resulting suspension was 32 grams per liter.

The gamma ferric oxide particles obtained had an average length of 0.15 to 0.25 micron and an average acicularity ratio of 7 to 8.

EXAMPLE 8

As previously indicated, undesirable by-products such as cubic magnetite are formed during the precipitation if a reducing agent is not used in the process, as described herein. This example illustrates this feature of the invention.

RUN A 10 liters of demineralized water, 1,708 grams (600 percent excess) sodium hydroxide and 10 grams of sodium hydrosulfite ($Na_2S_2O_4.2H_2O$) reducing agent were placed in a 20 liter vessel. After complete dissolution of the components in the solution, the temperature was lowered and stabilized at 45° C. Using the motor driven hollow shaft and dispersing device of Audran U.S. Pat. No. 2,996,287, issued Aug. 15, 1961 (corresponding French Pat. No. 1,157,156) and described hereinbefore, a solution containing 2 liters of demineralized water, 808 grams of ferrous sulfate ($FeSO_4.7H_2O$), 40 grams of cobaltous sulfate ($CoSO_4.7H_2O$) and 10 grams of sodium hydrosulfite ($Na_2S_2O_4.2H_2O$) was flowed into the sodium hydroxide solution in about 3 minutes. The solution in the reaction vessel was maintained at 45° C. throughout the reaction.

Thirty minutes after the end of the precipitation of the hydroxide, air was blown progressively into the suspension maintained at 45° C., at a flow rate of 15 liters/hour using the aforementioned dispersing device.

After 4 hours of oxidation, the temperature was raised to the boiling point of the dispersion for 30 minutes. The dispersion contained about 22 grams/liter of cobalt doped alpha ferric oxide hydrate. The dispersion was filtered, washed with demineralized water and the resulting non-magnetic, cobalt doped alpha ferric oxide hydrate particles were dried. An electron micrograph of a sample of these particles was made and designated 8-A-1.

The procedure of this Run A was repeated using the same sodium hydroxide and ferrous salt solutions except that the stoichiometric excesses of sodium hydroxide were 400 percent, 300 percent, 200 percent, 100 percent, and 50 percent. Electron micrographs of samples of the cobalt doped alpha ferric oxide hydrate particles obtained in these runs were made and designated 8-A-2, 8-A-3, 8-A-4, 8-A-5, and 8-A-6, respectively. All electron micrographs (magnification 22,000X) from Run A are reproduced in the attached drawing.

RUN B

The procedure of Run A was repeated with the same sodium hydroxide and ferrous salt solutions except that the reducing agent was omitted. Electron micrographs of samples of cobalt doped alpha ferric oxide hydrate particles obtained with sodium hydroxide stoichiometric excesses of 600 percent, 400 percent, 300 percent, 200 percent, 100 percent and 50 percent were made for comparison with those prepared for Run A. These electron micrographs (magnification 22,000X) were designated 8-B-1 through 8-B-6 and are reproduced in the attached drawing.

The electron micrographs for the materials obtained in Runs A and B clearly illustrate that, in the absence of a reducing agent, cubic crystals of magnetite are formed as the excess of alkaline hydroxide is progressively reduced. Such crystals are readily apparent in the electron micrograph designated 8-B-3 (300 percent stoichiometric excess of sodium hydroxide) and are clearly dominant in the electron micrograph designated 8-B-6 (50 percent stoichiometric excess of sodium hydroxide). In contrast, there is no evidence of cubic crystals of magnetite in the electron micrographs designated 8-A-1 through 8-A-6. Furthermore, the electron micrographs clearly illustrate that the alpha ferric hydrate particles formed in the process of this invention using the reducing agent are more homogeneous in size and shape than corresponding particles formed without using such reducing agent. This homogeneity provides superior magnetic recording and reproducing properties in magnetic iron oxides prepared from such alpha ferric oxide hydrate particles.

EXAMPLE 9

Example 2 was repeated with the following solutions:

| Sodium Hydroxide Solution | |
|---|---|
| demineralized water | 10 l. |
| sodium hydroxide | 640 g. (90 percent excess) |
| Ferrous Salt Solution | |
| demineralized water | 2 l. |
| ferrous sulfate | 1,123 g. |
| cobaltous sulfate | 54 g. |
| sodium hydrosulfite | 10 g. |

The cobalt doped gamma ferric oxide particles obtained had an average length of 0.05 to 0.2 micron, and an average acicularity ratio of 6 to 8.

EXAMPLE 10

The procedure of Example 2 was repeated, using the following solutions:

| Sodium Hydroxide Solution | |
|---|---|
| demineralized water | 10 l. |
| sodium hydroxide | 432 g. (100 percent excess) |
| sodium hydrosulfite | 6 g. |
| Ferrous Salt Solution | |
| demineralized water | 2 l. |
| ferrous sulfate | 750 g. |
| cobaltous sulfate | 34.3 g. |
| sodium hydrosulfite | 10 g. |

The procedure and conditions of Example 2 were repeated except that the flow rate of air to the suspension of ferrous hydroxide particles was 30 liters per hour and the concentration of the alpha ferric oxide hydrate in the resulting suspension was 20 grams per liter.

The cobalt doped gamma ferric oxide particles obtained had an average length of 0.15 to 0.2 micron and an average acicularity ratio of 8 to 10.

EXAMPLE 11

As previously indicated, the magnetic iron oxide particles prepared according to the practice of this invention can contain ferrous iron dopant ions. To illustrate this feature of the invention, the procedure of Example 6 was repeated, except that the cobalt doped alpha ferric oxide hydrate particles were dehydrated at 270° C. to alpha ferric oxide particles and oxidized at 325° C. to cobalt doped ferrous ferric oxide particles containing about 20 atomic percent of ferrous ions, based on total iron ions. (Theoretical magnetite composition being about 33 atomic percent of ferrous ions, based on total iron ions). These cobalt doped ferrous ferric oxide particles had an average length of 0.15 to 0.2 micron and an average acicularity ratio of 7 to 8.

A sample of these cobalt doped ferrous ferric oxide particles was dispersed and coated to form a magnetic recording layer having a coercivity ($H_c$) of 973 Oe using the procedure of Example 2. The signal level (dB) for the layer was as follows:

| 10 K | 100 K | 300 K | Max. 300 K w/bias | Max. 300 K w/o bias |
|---|---|---|---|---|
| −2.5 | +2.0 | +8.0 | +9.5 | +8.0 |

EXAMPLE 12

In practicing this invention, ferric ion contaminants in the ferrous salt solution can be reduced to ferrous ions by subjecting the ferrous salt solution to electrolytic reduction prior to initiating precipitation of the ferrous hydroxide particles. The following procedure can be used to illustrate this feature of the invention.

10 liters of demineralized water, 640 grams (90 percent excess) sodium hydroxide and 4 grams of sodium hydrosulfite ($Na_2S_2O_4.2H_2O$) reducing agent are placed in a 20 liter vessel. After complete dissolution of the components in the solution, the temperature is lowered to 25° C. and stabilized.

A solution containing 2 liters of demineralized water, 1,123 grams of a Commercial Grade or Chemically Pure grade ferrous sulfate ($FeSO_4.7H_2O$), and 54 grams of cobaltous sulfate ($CoSO_4.7H_2O$) is prepared. This solution can be subjected to electrolytic reduction in a direct current electrolysis cell (while excluding air from the cell by evacuation or by blanketing the cell with an inert non-oxidizing gaseous atmosphere such as nitrogen), and while also isolating the anode in a separate replaceable anolyte solution to prevent reoxidation of $Fe++$ to $Fe+++$ at the anode. Isolation can be accomplished by a barrier of either a cation permeable membrane, i.e., one which is not porous and is not permeable to anions, or a porous membrane, i.e., one which is permeable to both anions and cation, positioned between the anode and cathode to block access of the ferrous sulfate solution to the anode, and thus prevent the production of ferric ion from ferrous ion at the anode. A suitable cell design which can be adapted to this purpose is described in Baden et al U.S. Pat. No. 4,036,715, issued July 19, 1977. When monitoring by any of the conventional techniques shows that all ferric ions introduced with the ferrous sulfate have been reduced to ferrous ions, the solution is flowed into the above sodium hydroxide solution (while carefully protecting it from any re-oxidation during this transfer) in about 3 minutes. The solution in the reaction vessel is maintained at 25° C. throughout the reaction.

The resulting suspension of ferrous hydroxide can then be further treated as in Example 2. The resulting cobalt doped gamma ferric oxide particles will exhibit an average length of about 0.15 to 0.2 micron and an average acicularity ratio of about 6 to 8.

This invention has been described in detail with particular reference to preferred embodiments thereof, but it will be understood that variations and modifications can be effected within the spirit and scope of the invention.

What is claimed is:

1. In a process for preparing acicular magnetic iron oxide particles comprising (a) adding an aqueous solution of ferrous salt to an aqueous solution of a stoichiometric excess of alkaline hydroxide while substantially avoiding local excesses of said ferrous salt, to form an aqueous dispersion of ferrous hydroxide particles, (b) oxidizing said particles to form non-magnetic alpha ferric oxide hydrate particles, and (c) converting said non-magnetic particles to magnetic iron oxide particles by dehydration and reduction or dehydration, reduction and oxidation, the improvement wherein said ferrous salt solution is subjected to reducing conditions prior to or during said addition to reduce contaminating ferric ions present therein to ferrous ions.

2. A process according to claim 1 in which said reducing conditions are provided by adding said ferrous salt solution to said alkaline hydroxide solution in the presence of a sufficient concentration of reducing agent to reduce said ferric ions to ferrous ions.

3. A process according to claim 2 in which said reducing agent is an inorganic reducing agent.

4. A process according to claim 3 in which said reducing agent is sodium sulfite or sodium hydrosulfite.

5. A process according to claim 3 in which said reducing agent is added to said aqueous solution of ferrous salt in a concentration in the range of about 10 to 100 meq. per mole of said ferrous salt.

6. A process according to claim 2 in which said reducing agent is a sulfite, hydrosulfite, dihydroxybenzene, or hydroxylamine.

7. A process according to claim 2 in which said reducing agent is added to at least one of said aqueous solutions of ferrous salt or alkaline hydroxide.

8. A process according to claim 2 in which said reducing agent is sodium sulfite, sodium hydrosulfite, hydroquinone or hydroxylamine hydrochloride and is added to said aqueous solution of alkaline hydroxide in a concentration in the range of about 2 to 12 meq. per liter.

9. A process according to claim 2 in which said stoichiometric excess is in the range of about 50 to 100 percent.

10. A process according to claim 9 in which said reducing agent is a sulfite, hydrosulfite, dihydroxybenzene or hydroxylamine.

11. A process according to claim 9 in which said reducing agent is sodium sulfite or sodium hydrosulfite and is added to said aqueous solution of ferrous salt.

12. A process according to claim 1 in which said stoichiometric excess of alkaline hydroxide does not exceed 250 percent.

13. A process according to claim 12 in which said alkaline hydroxide is an alkali metal hydroxide.

14. A process according to claim 13 in which said alkali metal is sodium or potassium and said reducing agent is added to said aqueous solution of ferrous salt.

15. A process according to claim 13 in which said ferrous salt is ferrous sulfate or ferrous chloride.

16. A process according to claim 12 in which said non-magnetic particles are dehydrated, reduced and oxidized to form magnetic gamma ferric oxide particles.

17. A process according to claim 1 including the additional step of doping said magnetic particles with doping metal ions.

18. A process according to claim 17 in which said doping metal ions are present in said aqueous solution of ferrous salt.

19. A process according to claim 17 in which said doping metal ions are cobalt ions.

20. A process according to claim 17 in which said doping metal ions are ions of cobalt, ferrous iron, nickel, chromium, zinc, cadmium, manganese, calcium, tin, samarium, or europium.

21. A process according to claim 20 in which said doping metal ions are ions of cobalt and calcium.

22. A process according to claim 1 in which said non-magnetic particles are dehydrated and reduced to form magnetic ferrous ferric oxide particles.

23. A process according to claim 1 in which said non-magnetic particles are dehydrated, reduced and oxidized to form magnetic gamma ferric oxide particles.

* * * * *